(12) United States Patent
Wakjira et al.

(10) Patent No.: US 9,606,303 B2
(45) Date of Patent: Mar. 28, 2017

(54) GROUPING DEVICE FOR HIGH DENSITY CONNECTOR ARRANGEMENTS

(75) Inventors: Jillcha F. Wakjira, Hickory, NC (US); Alan Benner, Poughkeepsie, NY (US); Russell Granger, Vale, NC (US); Darrell R. Childers, Hickory, NC (US)

(73) Assignees: US Conec, Ltd., Hickory, NC (US); International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/409,509

(22) Filed: Mar. 1, 2012

(65) Prior Publication Data

US 2012/0251051 A1 Oct. 4, 2012

Related U.S. Application Data

(60) Provisional application No. 61/448,168, filed on Mar. 1, 2011.

(51) Int. Cl.
*G02B 6/00* (2006.01)
*G02B 6/38* (2006.01)

(52) U.S. Cl.
CPC .......... *G02B 6/3879* (2013.01); *G02B 6/3825* (2013.01); *G02B 6/3885* (2013.01); *G02B 6/3893* (2013.01); *G02B 6/3895* (2013.01); *G02B 6/3897* (2013.01)

(58) Field of Classification Search
CPC .. G02B 6/3825; G02B 6/3879; G02B 6/3895; G02B 6/3897
USPC ........................................... 385/134–139, 59
See application file for complete search history.

(56) References Cited

U.S. PATENT DOCUMENTS

| | | | |
|---|---|---|---|
| 5,093,885 A * | 3/1992 | Anton | 385/134 |
| 6,394,831 B1 * | 5/2002 | Bowers et al. | 439/327 |
| 6,409,392 B1 | 6/2002 | Lampert et al. | |
| 6,412,986 B1 * | 7/2002 | Ngo | G02B 6/3825 385/53 |
| 6,588,939 B2 | 7/2003 | Lee | |
| 6,712,523 B2 * | 3/2004 | Zimmel | G02B 6/3825 385/55 |
| 8,920,043 B2 * | 12/2014 | Iwaya | G02B 6/3879 385/136 |
| 2002/0181888 A1 * | 12/2002 | Zimmel | G02B 6/3825 385/72 |
| 2004/0141692 A1 * | 7/2004 | Anderson | G02B 6/3825 385/53 |
| 2005/0018973 A1 * | 1/2005 | Loder | G02B 6/3849 385/53 |
| 2009/0142965 A1 * | 6/2009 | Spitaels et al. | 439/639 |
| 2009/0285541 A1 * | 11/2009 | Kowalczyk et al. | 385/135 |
| 2010/0111484 A1 * | 5/2010 | Allen | 385/135 |
| 2010/0158465 A1 * | 6/2010 | Smrha | 385/135 |
| 2010/0255716 A1 * | 10/2010 | Frey et al. | 439/540.1 |
| 2011/0019965 A1 * | 1/2011 | Smith et al. | 385/135 |

(Continued)

*Primary Examiner* — Ryan Lepisto
*Assistant Examiner* — Guy Anderson
(74) *Attorney, Agent, or Firm* — Michael L. Leetzow, P.A.

(57) ABSTRACT

A tool-less grouping apparatus has a main body with a top portion and a bottom portion. Dividing members extending between the top and bottom portions make openings for fiber optic connectors. Forward facing surfaces may be on both the top and bottom portions to engage the fiber optic connectors. The portions also have cut-outs that can engage the fiber optic connectors to assist in removing the fiber optic connectors from adapters.

21 Claims, 7 Drawing Sheets

(56) References Cited

U.S. PATENT DOCUMENTS

2011/0081124 A1\* 4/2011 Zimmel et al. .............. 385/135
2012/0033926 A1\* 2/2012 de Jong ...................... 385/135
2012/0189261 A1\* 7/2012 Denter et al. ................ 385/135

\* cited by examiner

GROUPING DEVICE FOR HIGH DENSITY CONNECTOR ARRANGEMENTS

REFERENCE TO RELATED CASE

This application claims priority under 35 U.S.C. §119 (e) to provisional application No. 61/448,168, filed on Mar. 1, 2011, which is hereby incorporated by reference in its entirety.

BACKGROUND OF THE INVENTION

Field of the Invention

Fiber optic systems today require a high density of connectors, meaning that the connectors are tightly packed into the system. The high density of connectors makes it difficult to insert and remove connectors. It also makes organization and identification of the connectors very difficult if not impossible. In some systems, the number of connections can reach into the hundreds and thousands of connections, with the distances between the connections too far to enable the user to trace them back. Thus, it would be preferable if the connectors could be linked to one another, and groups of the connectors connected at the same time. The linking of the connectors would also make the organization easier and allow for the marking and identification of the connector possible. Other advantages to having the connectors grouped at the time of manufacturing. First, it is possible to reduce routing errors because each set of grouped connectors can be tested with a common test setup to verify the channel routing of all channels in all connectors within a particular group. Second, labor costs are higher for workers in the field than at the manufacturer level. Populating the connectors into the grouping apparatus, the costs of the grouped connectors can be reduced.

Thus, a grouping apparatus that would allow for multiple fiber optic connectors to be linked to one another is needed. The individual connectors would need to be able to be removed from adapters in which they are plugged and the apparatus should not require any tools to add or remove any connectors.

SUMMARY OF THE INVENTION

The present invention is directed to a grouping apparatus for use with a plurality of fiber optic connectors that includes a top portion having a front end and a back end, a bottom portion having a front end and a back end, a plurality of dividing members extending between the top and bottom portions creating a plurality of openings in the grouping apparatus extending between the front and back ends of the top and bottom portions, and a plurality of forward facing surfaces disposed on the bottom portion adjacent the back end thereof, one of the plurality of forward facing surfaces disposed in each of the plurality of openings to engage a fiber optic connector.

In some embodiments, the grouping apparatus also includes a plurality of cut-out portions in at least one of the top and the bottom portions, each of the plurality of cut-out portions being associated with one of the plurality of openings and configured to engage a portion of a fiber optic connector inserted into the associated opening.

In some embodiments, the grouping apparatus also includes a second plurality of forward facing surfaces disposed on the top portion adjacent the back end thereof, one of the plurality of forward facing surfaces disposed in each of the plurality of openings to engage a fiber optic connector.

In yet another aspect, the invention is directed to a tool-less grouping apparatus for use with a plurality of fiber optic connectors that includes a main body having a front end, a back end, and a plurality of openings, each of the plurality of openings configured to receive one of the fiber optic connectors, an cut out in a top portion of each of the openings, and a plurality of forward facing surfaces disposed adjacent the back end of the grouping apparatus, one of the plurality of forward facing surfaces disposed in each of the plurality of openings to engage a fiber optic connector.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
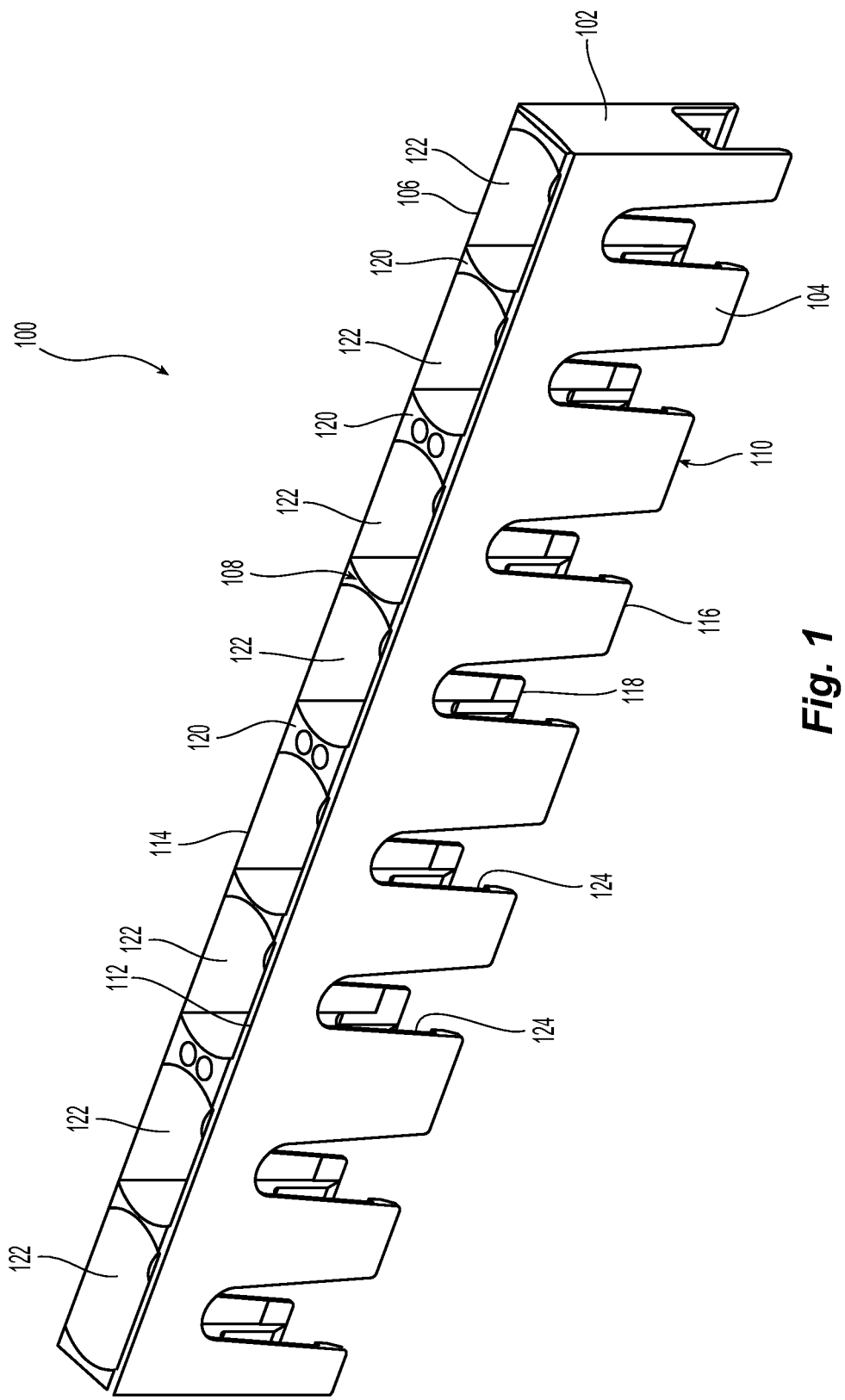
FIG. 1 is a top, front perspective view of one embodiment of a grouping apparatus according to the present invention.
Figure 2:
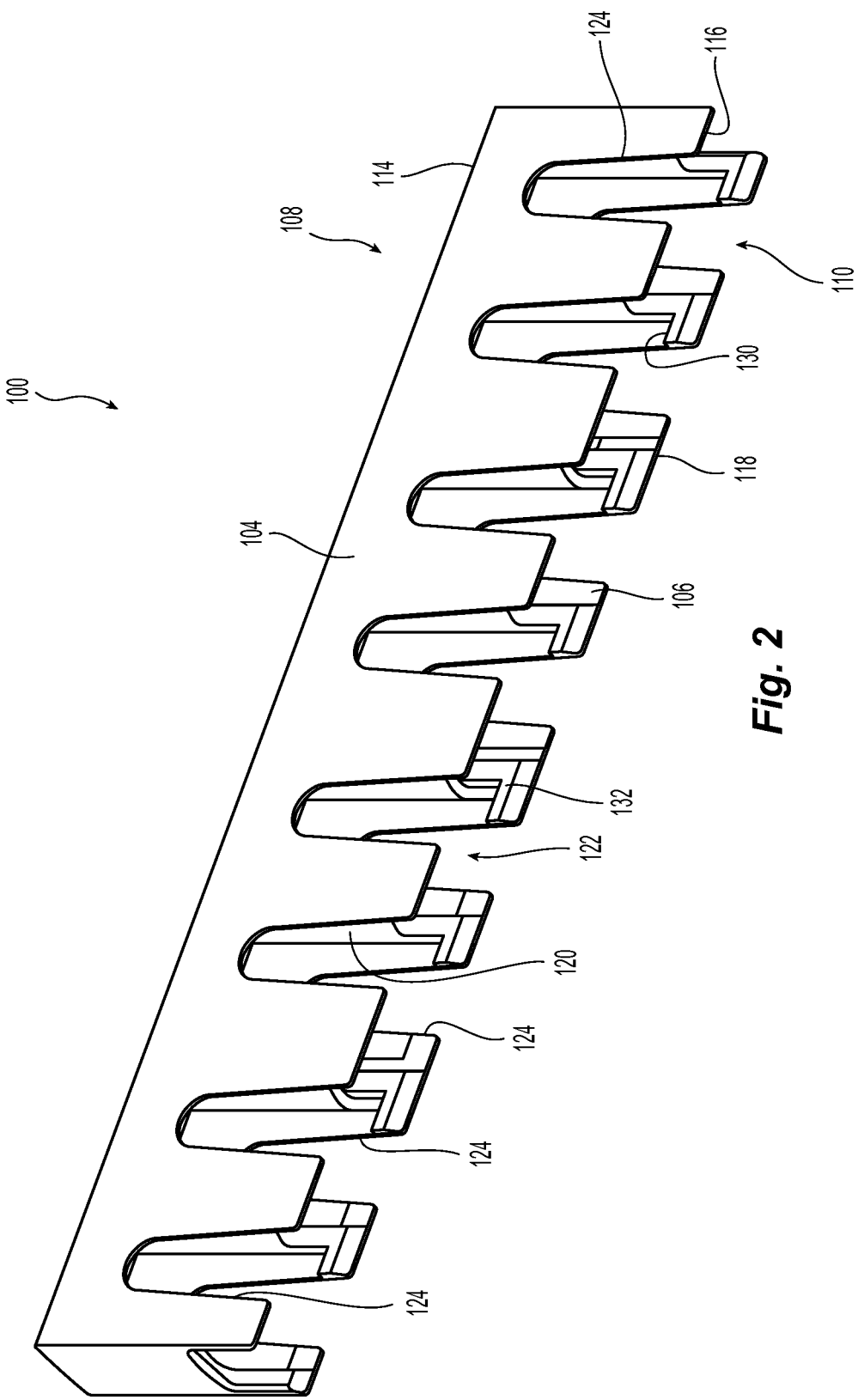
FIG. 2 is a back, rear perspective view of the grouping apparatus of FIG. 1.
Figure 3:
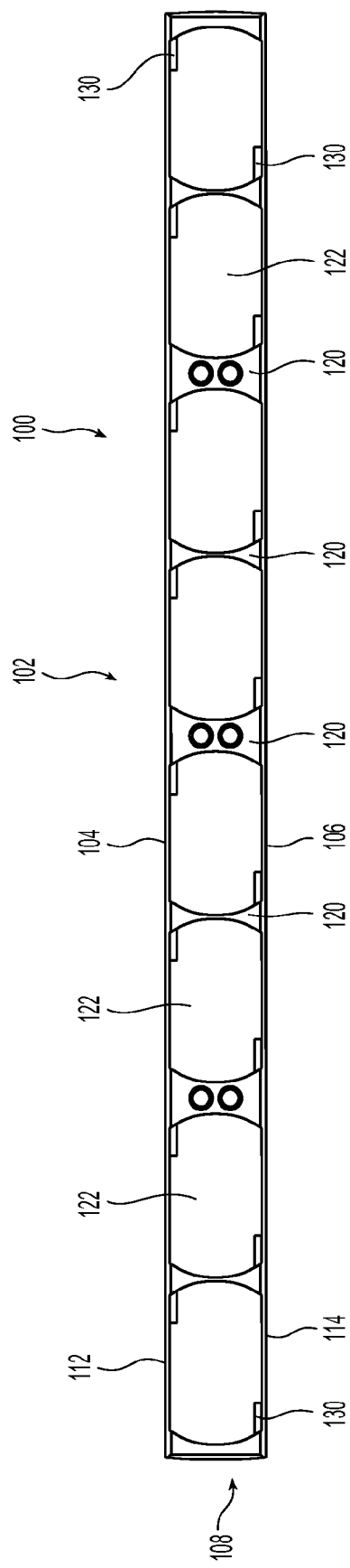
FIG. 3 is a front view of the grouping apparatus of FIG. 1.
Figure 4:
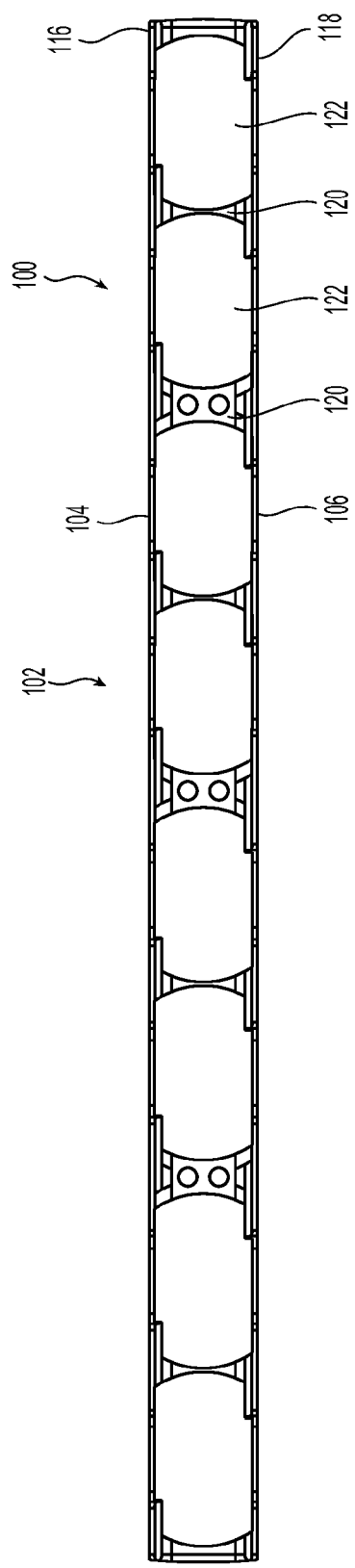
FIG. 4 is a back view of the grouping apparatus of FIG. 1.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIGS. 1-4, a tool-less grouping apparatus 100 is illustrated. The tool-less grouping apparatus 100 has a main body 102 that includes a top portion 104 and a bottom portion 106. The main body 102 has a front end 108 and a back end 110. The front end 108 corresponds with the front ends 112,114 of the top portion 104 and the bottom portion 106, respectively. Similarly, the back end 110 corresponds to the back ends 116,118 of the top portion 104 and the bottom portion 106, respectively. The main body 102 also has a plurality of dividing members 120 that divide the space between the top portion 104 and the bottom portion 104 into a plurality of openings 122 to receive fiber optic connectors, preferably the MTP brand of the MPO-style multi-fiber push-on/pull-off connectors. However, other style of connectors could be used and still be within the scope of the present invention. The tool-less grouping apparatus 100 is illustrated as accommodating 8 connectors with the 8 openings 122, but more or fewer openings 122 are also possible. It should be noted that every other dividing member 120 is thicker than the other dividing members 120—this allows for the spacing required in adapters (see, e.g., FIGS. 3 and 4).

Each of the top and bottom portions 104,106 also preferably have a plurality of cut-outs 124 that, as described in detail below, are used with corresponding structures on the connectors to assist in removing the connectors from adapters. While the plurality of cut-outs 124 are in both the top and bottom portions 104,106, cut-outs 124 could be provided in only one of the top and bottom portions 104,106.

Figure 6:
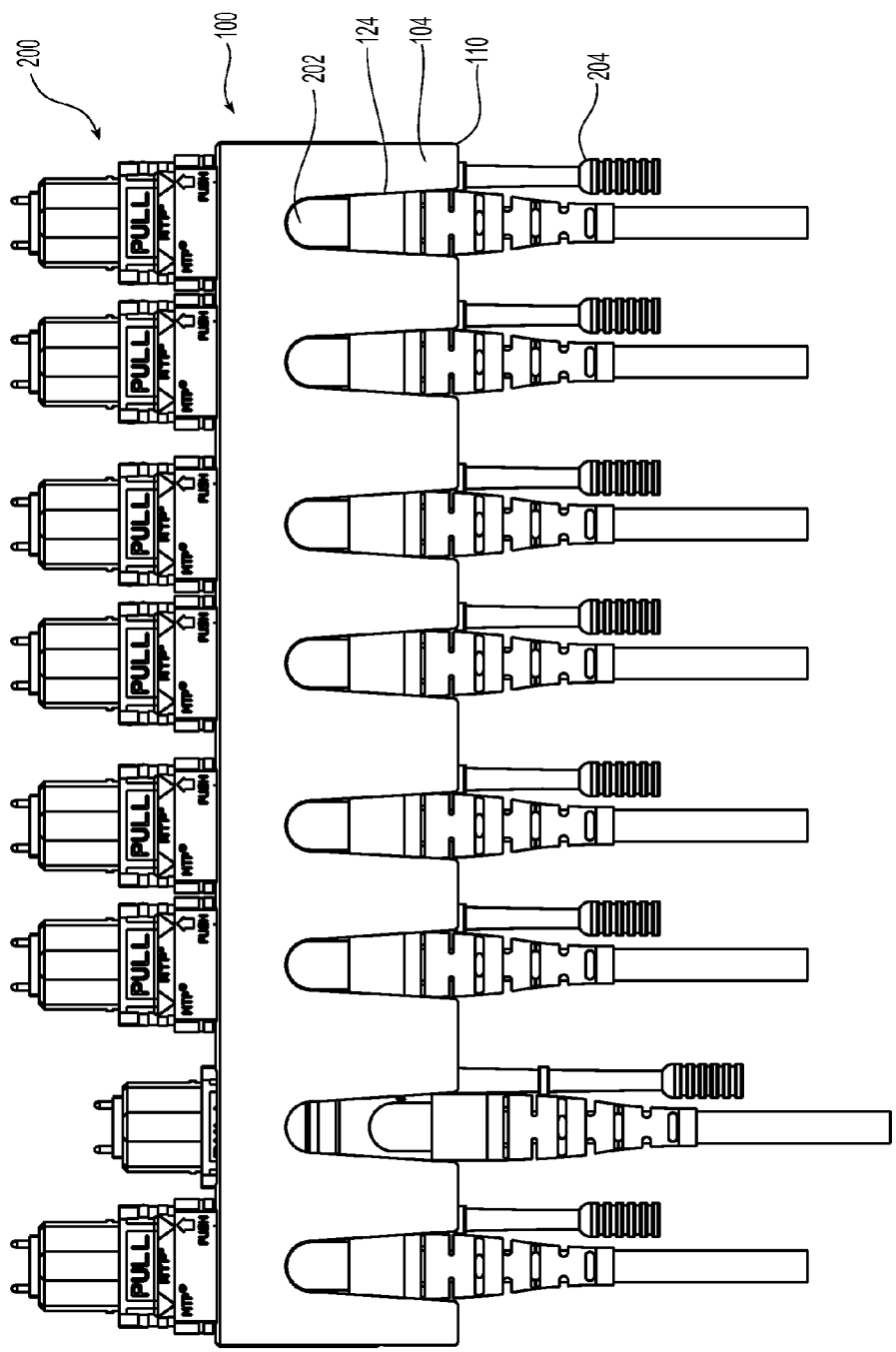
FIG. 6 is a top view of the grouping apparatus of FIG. 1 illustrating one connector in a rearward position.
Figure 7:
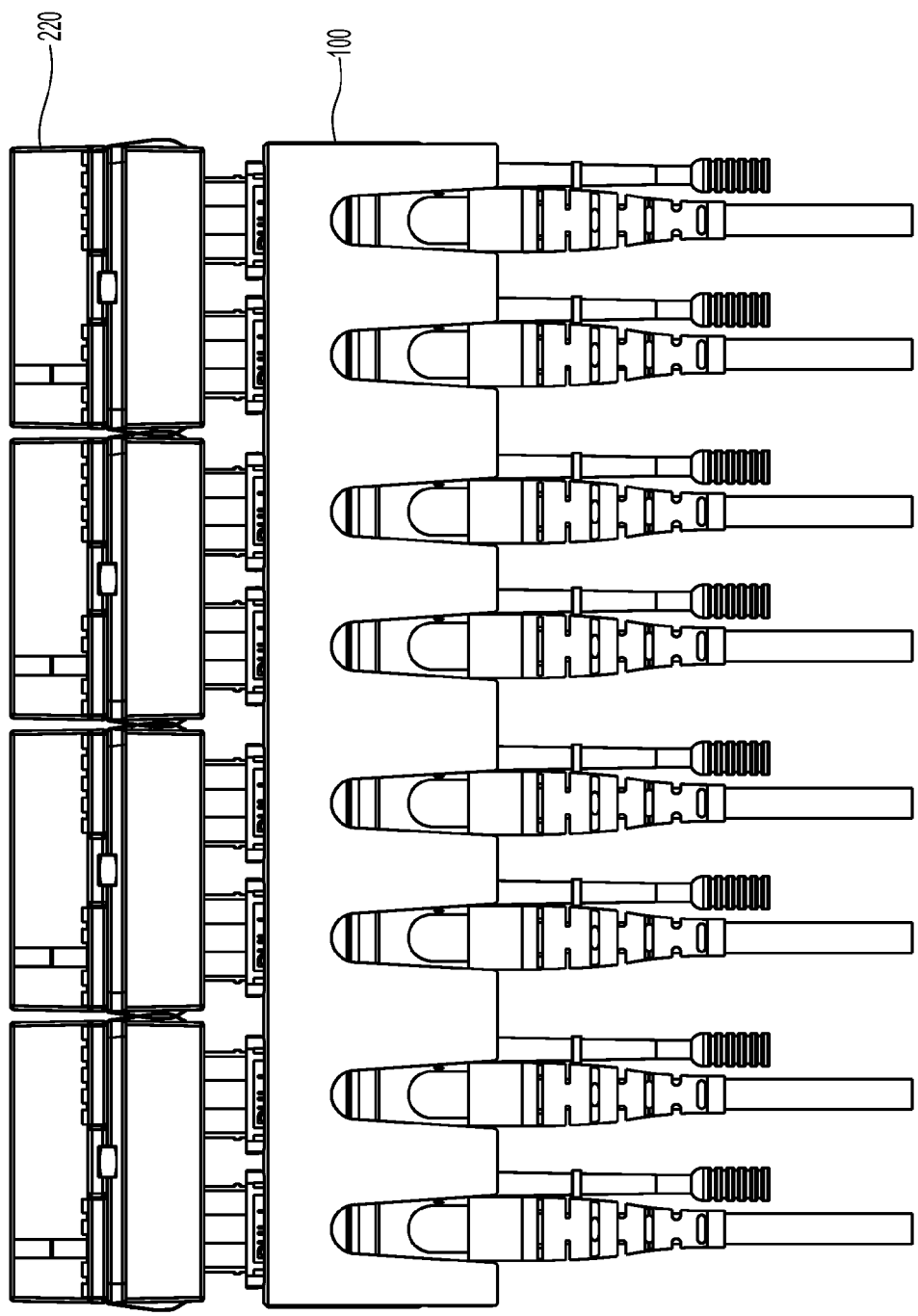
FIG. 7 illustrates the grouping apparatus and connectors being inserted as a group into adapters.
Figure 8:
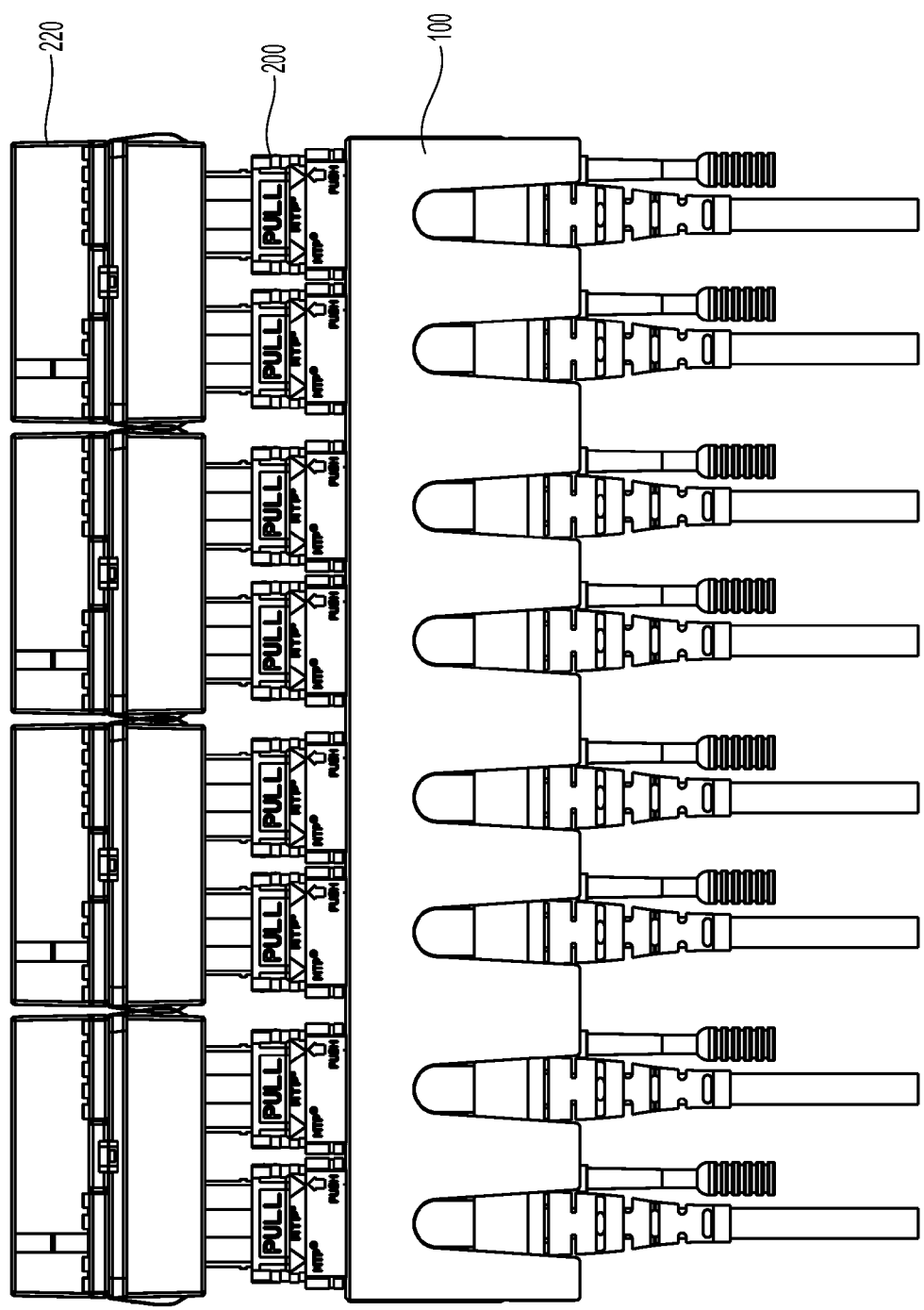
FIG. 8 illustrates the grouping apparatus and connectors being removed in a group from the adapters.

Each of the openings 122 also have a forward facing surface 130 that is adjacent the back end 110 (and back ends 116,118 of the top portion 104 and the bottom portion 106). The forward facing surface 130 provides a surface against which the housing (and as illustrated in FIGS. 6-8, the push/pull tab handle) engages to retain the connectors within the tool-less grouping apparatus 100. There are preferably two forward facing surfaces 130 in each of the openings 122. One is on the bottom right and the other on the top left. A careful inspection of the tool-less grouping apparatus 100 in the figures will reveal that the tool-less grouping apparatus 100 can be flipped over and have the same configuration. The forward facing surfaces 130 are extensions of the supports 132 that run from the ends of the dividing members 120 to the back end 110 of the main body. The grouping apparatus 100 is considered to be tool-less because it does not take a special tool to remove the connectors from the grouping apparatus 100, but a user simply needs to deflect the back end 110 adjacent the opening 122 to move the forward facing surfaces 130 out of the way of the connector/housing.

The tool-less grouping apparatus 100 is a single, unitary piece. That is, the tool-less grouping apparatus 100 does not begin as two pieces and the connectors are inserted into one of the pieces and the second piece is then attached to the first piece. Rather, the tool-less grouping apparatus 100 is preferably molded in a single mold in one step.

The openings 122 of the tool-less grouping apparatus 100 preferably have material that encloses, at least partially, all the way around the openings 122. That is, the tool-less grouping apparatus 100 provides guidance along all four sides of the connectors that are inserted therein.

Figure 5:
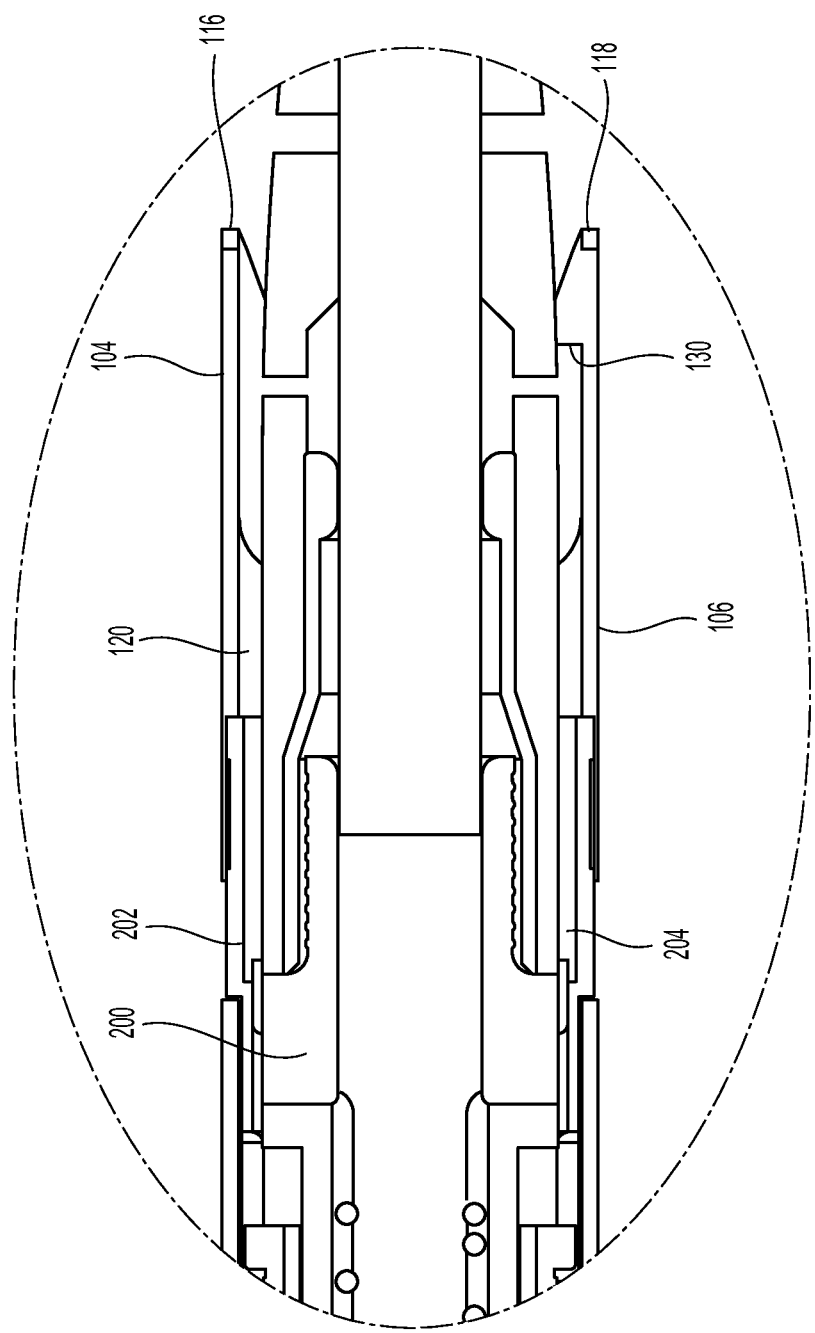
FIG. 5 is a cross section view of the grouping apparatus of FIG. 1 with a connector inserted in the grouping apparatus.

It should be noted that while guidance is provided along all four sides, the connectors inserted into the tool-less grouping apparatus 100 are still able to move relative to the tool-less grouping apparatus 100. As illustrated in FIG. 5, the forward movement of the connectors 200 is limited by the projection 202 on the handle 204 engaging the top portion 104 (and in some cases, the bottom portion 106) and the rearward movement by the handle 204 engaging the forward facing surfaces 130. This allows for individual connectors to be removed from engagement in the adapters, but still remain in the tool-less grouping apparatus 100. See FIG. 6. A user only needs to pull on the handle of the connector 200 to disengage the connector from the adapter, but the forward facing surface 130 would prevent the connector 200 from being removed from the tool-less grouping apparatus. A single connector 200 can then be removed from the grouping apparatus 100 while the other connectors 200 remain in the grouping apparatus. The same process can also be applied in the opposite direction by installing the connectors 200 into the grouping apparatus 100 and continuing to push on the connector 200 so that it connects in the adapter.

The tool-less grouping apparatus 100, as noted above, allows for insertion and removal of all of the connectors in the tool-less grouping apparatus 100 as illustrated in FIGS. 7 and 8. Once the connectors 200 are all inserted into the tool-less grouping apparatus 100, the entire grouping apparatus with the connectors 200 can be inserted into adapters as illustrated in FIG. 7. As the connectors 200 are aligned with the adapters 220 (illustrated as 2×8 blocks), the tool-less grouping apparatus 100 can be pressed forward and the forward facing surfaces 130 pushes on the housings/handles of the connectors 200 to move the connectors 200 into the adapters.

To remove all of the connectors 200 at one time as illustrated in FIG. 8, the tool-less grouping apparatus 100 is pulled away from the adapters and the projection 202 on the handle 204 engages the top portion 104 (and in some cases, the bottom portion 106) of the tool-less grouping apparatus 100, which disengages the housing from the adapter and allows removal. A tab could be added to the tool-less grouping apparatus 100 to all for easier grasping if so desired.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A grouping apparatus for use with a plurality of fiber optic connectors, each of the plurality of fiber optic connectors having a connector housing, comprising:

a top portion having a front end and a back end;

a bottom portion having a front end and a back end, a plurality of dividing members extending between the top and bottom portions creating a plurality of openings in the grouping apparatus extending between the front and back ends of the top and bottom portions;

a plurality of forward facing surfaces fixedly attached to the bottom portion adjacent the back end thereof, one of the plurality of forward facing surfaces disposed in each of the plurality of openings to engage a fiber optic connector; and a plurality of cut-out portions in at least one of the top and the bottom portions, each of the plurality of cut-out portions being associated with one of the plurality of openings and each of the plurality of forward facing surfaces disposed between a cut-out portion and a dividing member of each of the plurality of openings.

2. The grouping apparatus according to claim 1, further comprising a second plurality of forward facing surfaces fixedly attached to the top portion adjacent the back end thereof, one of the plurality of forward facing surfaces disposed in each of the plurality of openings to engage a fiber optic connector.

3. The grouping apparatus according to claim 1, further comprising a second plurality of cut-out portions in the other of the top and the bottom portions, each of the plurality of cut-out portions being associated with one of the plurality of openings and configured to engage a portion of the connector housing of the fiber optic connector inserted into the associated opening.

4. The grouping apparatus according to claim 1, wherein at least one of the plurality of dividing members extending between the top and bottom portions is thicker than the others.

5. The grouping apparatus according to claim 1, wherein each of the openings are enclosed on at least a portion of four sides.

6. The grouping apparatus according to claim 1, wherein the grouping apparatus is a single, unitary apparatus.

7. The grouping apparatus according to claim 1, wherein a fiber optic connector can move within the opening in a direction between the front and back ends.

8. The grouping apparatus according to claim 1, wherein the grouping apparatus can be used to remove and insert fiber optic connectors inserted therein from and into adapters, the adapters having a first side to receive connectors disposed within the grouping apparatus and a second side having openings to configured to receive another fiber optic connector.

9. The grouping apparatus according to claim 1, wherein one fiber optic connector inserted in the grouping apparatus can be inserted into and removed from an adapter independent of other fiber optic connectors inserted in the grouping apparatus the adapter having a first side to receive connectors disposed within the grouping apparatus and a second side having openings to configured to receive another fiber optic connector.

10. The grouping apparatus according to claim 1, wherein the bottom portion having the forward facing surface can be deflected away from the opening to allow the connector to be removed.

11. A tool-less grouping apparatus for use with a plurality of fiber optic connectors comprising:
 a main body having a front end, a back end, and a plurality of openings, each of the plurality of openings configured to receive one of the fiber optic connectors, at least a portion of the fiber optic connector extending beyond the front end of the main body when inserted;
 a cut-out in a top portion of each of the openings, the cut-out extending from the front end towards the back end; and
 a plurality of forward facing surfaces disposed adjacent the back end of the grouping apparatus, one of the plurality of forward facing surfaces disposed in each of the plurality of openings to engage a fiber optic connector.

12. The tool-less grouping apparatus according to claim 11, further comprising a plurality of dividing members extending between each of the openings and at least one of the plurality of dividing members is thicker than the others.

13. The tool-less grouping apparatus according to claim 11, wherein the tool-less grouping apparatus is a single, unitary apparatus.

14. The tool-less grouping apparatus according to claim 11, wherein a fiber optic connector can move within the opening in a direction between the front and back ends.

15. The tool-less grouping apparatus according to claim 11, wherein the grouping apparatus can be used to remove and insert fiber optic connectors inserted therein from and into adapters.

16. The tool-less grouping apparatus according to claim 11, wherein one fiber optic connector inserted in the tool-less grouping apparatus can be inserted into and removed from an adapter independent of other fiber optic connectors inserted in the tool-less grouping apparatus.

17. A grouping apparatus for use with a plurality of fiber optic connectors, each of the plurality of fiber optic connectors having a connector housing, comprising:
 a top portion having a front end and a back end;
 a bottom portion having a front end and a back end,
 a plurality of dividing members extending at least partially between the top and bottom portions creating a plurality of openings in the grouping apparatus extending between the front and back ends of the top and bottom portions, the openings configured to receive one of the fiber optic connectors, the fiber optic connector extending through the main body when inserted; and
 a plurality of forward facing surfaces disposed on the bottom portion adjacent the back end thereof, one of the plurality of forward facing surfaces disposed in each of the plurality of openings to engage a fiber optic connector; and
 a plurality of cut-out portions in at least one of the top and the bottom portions, each of the plurality of cut-out portions being associated with one of the plurality of openings and configured to engage a portion of the connector housing of the fiber optic connector inserted into the associated opening.

18. The grouping apparatus according to claim 17, further comprising a plurality of cut-out portions in at least one of the top and the bottom portions, each of the plurality of cut-out portions extending from the back end towards the front end and being associated with one of the plurality of openings and configured to engage a portion of a fiber optic connector inserted into the associated opening.

19. The grouping apparatus according to claim 17, further comprising a second plurality of forward facing surfaces disposed on the top portion adjacent the back end thereof, one of the plurality of forward facing surfaces disposed in each of the plurality of openings to engage a fiber optic connector.

20. A grouping apparatus for use with a plurality of fiber optic connectors, each of the plurality of fiber optic connectors having a connector housing, comprising:
 a top portion having a front end and a back end;
 a bottom portion having a front end and a back end,
 a plurality of dividing members extending at least partially between the top and bottom portions creating a plurality of openings in the grouping apparatus extending between the front and back ends of the top and bottom portions, each of the openings configured to receive only a single fiber optic connector therein, the fiber optic connector extending completely through the main body when inserted; and
 a plurality of forward facing surfaces fixedly attached to the bottom portion adjacent the back end thereof, one of the plurality of forward facing surfaces disposed in each of the plurality of openings to engage at least a portion of the connector housing.

21. The grouping apparatus according to claim 17, each of the plurality of forward facing surfaces is disposed adjacent one of the dividing members.

* * * * *